Feb. 28, 1939.  E. W. SEYMOUR  2,148,780
APPARATUS FOR WRAPPING PIPE
Filed Nov. 9, 1937   2 Sheets-Sheet 2
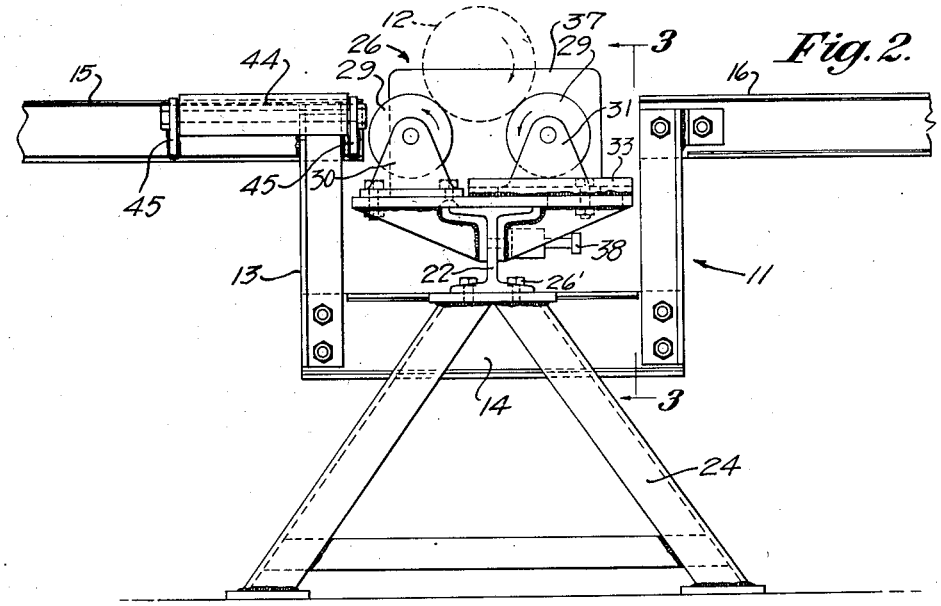
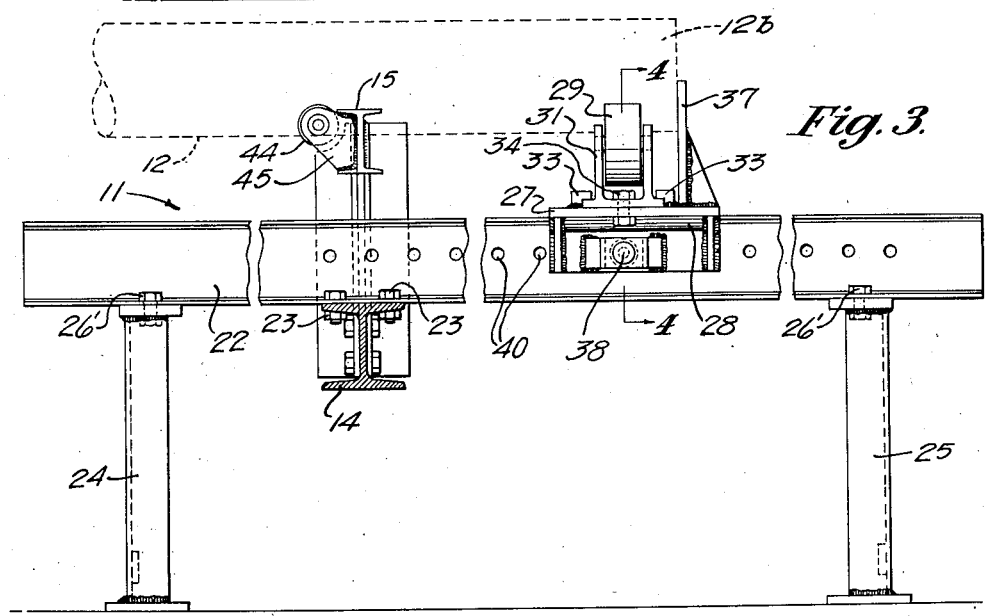
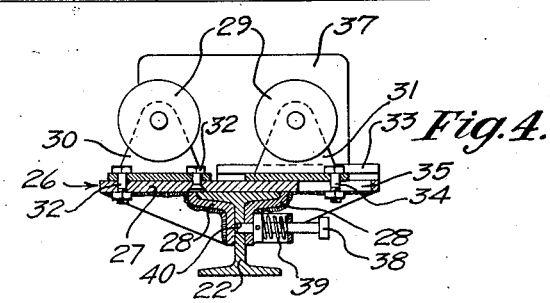
Inventor
Edward W. Seymour.
Attorney.

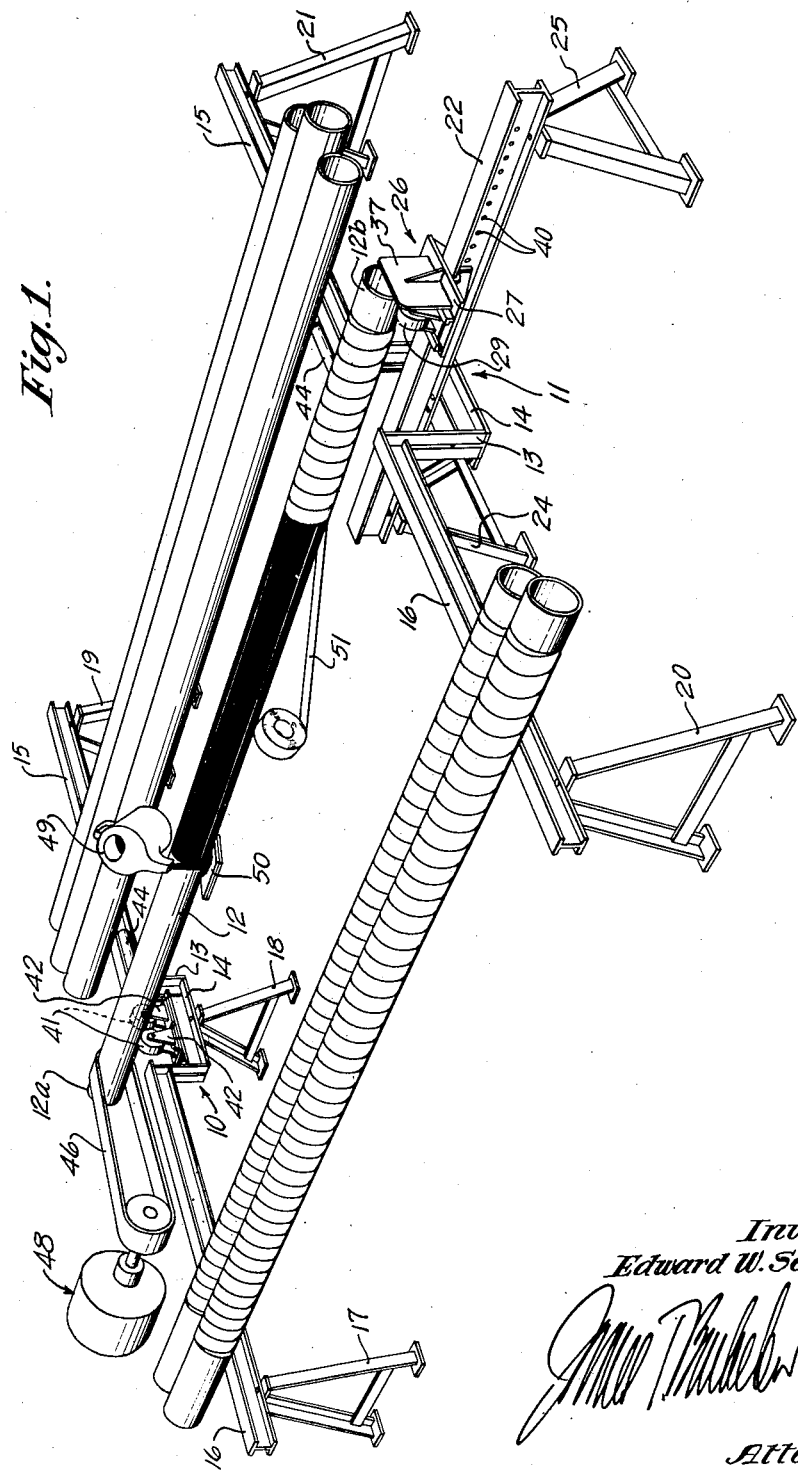

Patented Feb. 28, 1939

2,148,780

UNITED STATES PATENT OFFICE 2,148,780

APPARATUS FOR WRAPPING PIPE

Edward W. Seymour, Los Angeles, Calif.

Application November 9, 1937, Serial No. 173,612

6 Claims. (Cl. 214—1)

This invention has to do with an improved and simplified system for spirally wrapping pipe, whereby it is now made possible to effect large savings and a great number of conveniences, in comparison with the usual pipe wrapping operations requiring massive and expensive machines and which are necessarily limited to plants where such machines are installed. My principal object is to provide a system making it possible, with practically negligible expense for equipment, to wrap pipe at any location; even out in the field where the pipe is being laid.

Customary practice in spirally wrapping pipe is to apply the wrapping by large plant machines, either of the type operating to bodily advance and rotate the pipe as the wrapping is applied, or of the lathe type in which the pipe is rotated but held against endwise movement, and the wrapping fed onto the pipe from a carriage movable longitudinally thereof. As indicated, the use of such machines confines wrapping operations to comparatively few plants that can afford them, and frequently to locations far distant from places where the pipe is to be used, or places where the pipe might be wrapped to greater advantage.

In accordance with the invention, I have provided a system for wrapping pipe requiring but little equipment that may easily be transported and set up for operation in any location. The necessary equipment for mounting and rotating the pipe need consist only of a pair of portable supports for opposite ends of the pipe and on which the pipe is rotatable, suitable means, preferably adjustable and associated with one of the supports, for preventing endwise movement of the pipe in one direction, and a portable prime mover together with a suitable driving connection with the pipe for rotating the pipe independently of its end supports. To illustrate the practical convenience and simplicity from the standpoint of setting up and operating the equipment, the pipe supports, and any necessary racks, all may be transported in a truck to the place of operation, the supports and racks then set up, and the truck motor itself used to rotate the pipe.

The application of sphaltic or other protective coating, and one or more spiral wrappings, is done manually. After the pipe is placed on the supports and connected to its rotative drive, the usual hot asphalt coating material is manually poured along the rotating pipe, immediately followed by manual application of the wrapping to the hot asphalt. In this manner, two workmen, one applying the asphalt and the other following and feeding the wrapping, can for example alternately apply three asphalt coatings and wrapping layers to a thirty foot length of pipe in less than three minutes time. No appreciable delay is involved in changing pipe and the time consumed in the continuous wrapping of pipe is not greater than, and in most instances considerably less than the time required to wrap individual or a succession of pipes in the usual machine. Moreover, it is possible by this method to apply the coating and wrapping in as satisfactory condition as by fully mechanical operations. Accordingly, I am able to produce wrapped pipe comparable favorably as a product with full machine wrapped pipe, and by a method that is far more economical and convenient.

The invention can perhaps be explained to best advantage by reference to the accompanying drawings wherein I have shown certain typical forms of apparatus for carrying out the pipe wrapping operations, and in which:

Fig. 1 is a perspective view showing the equipment set up for wrapping pipe;

Fig. 2 is an end elevation, as viewed from the inside, of the longitudinally adjustable pipe supporting structure;

Fig. 3 is a side elevation of Fig. 2 as viewed from line 3—3 thereof; and

Fig. 4 is a cross section on line 4—4 of Fig. 3.

Referring to the general view of Fig. 1, the pipe wrapping apparatus comprises a pair of end supports, generally indicated at 10 and 11, for the pipe 12 being wrapped, these end supports preferably being structurally independent and of such construction as to be portable and capable of being set up at any location where it is desired to wrap pipe. Each of the end supporting structures comprises a U-shaped frame 13 including an H section base beam 14, and suitably attached to horizontal pipe supporting rails 15 and 16. The latter may be formed in a series of disconnectible sections extending beyond those shown, where provision is to be made for accommodating large numbers of unwrapped and wrapped pipe. Frame member 13 and the pipe supporting rails 15 and 16 associated with the end support 10 may be rested on any suitable supports, for instance the triangular legs indicated at 17, 18 and 19. The rails 15 and 16 at the opposite end of the pipe are rested on similar supports 20 and 21.

The supporting structure generally indicated at 11 comprises an I-beam 22 attached to the top flange of beam 14 by bolts 23, see Fig. 3. Beam 22 rests on a pair of supports 24 and 25 to which it may be attached by bolts 26'. The rails 15 and 16 may of course be similarly attached to their supports. Mounted on beam 22 and adjustable longitudinally thereof is a carriage, generally indicated at 26, comprising a base plate 27 having depending side portions 28 fitted to the I-beam 22, as clearly illustrated in Figs. 2 and 4. Mounted on base plate 27 is a pair of rollers 29 supported by carriers 30 and 31, the former of which is attached to the base plate by bolts 32. Carrier 31 is adjustable laterally of the supporting beam 22 between guides 33, and is retained in adjusted position by bolt 34 extended through a slot 35 in the base plate 27. Also mounted on base 27 and rigidly affixed thereto is an upright plate 37 positioned beyond the ends of the rollers 29 and engageable by the pipe 12, as indicated by the dotted lines in Fig. 3, to limit endwise movement of the pipe.

Since the individual pipes to be wrapped frequently vary substantially in length, and since it is desirable to maintain the driven end of the pipe in at least an approximately predetermined relation to the driving means, the pipe supporting carriage 26 is made adjustable longitudinally of its supporting beam 22 to accommodate pipes of different length. Plate 27 and its supported parts are slidably adjustable longitudinally on beam 22, and may be releasably maintained in adjusted position by any suitable means. As typical, I show in Fig. 4 a bolt 38 mounted on one of the sides 28 of the carriage and thrust by coil spring 39 into one of the holes 40 formed at spaced intervals in the center web of I-beam 22, as shown in Fig. 3. By withdrawing the inner end of bolt 38 from one of the holes, the adjustment of the carriage may be changed in conformity with the pipe length and the carriage then locked in changed position by inserting the bolt 38 in the proper hole 40.

As shown in Fig. 1, the supporting structure 10 also includes a pair of pipe supporting rolls 41 mounted on carriers 42 secured to the base beam 14. As will be understood without the necessity for further detailed showing, the roller carrier 42 may be made relatively adjustable transversely of the pipe 12 in a manner similar to the relative adjustment feature of carriers 30 and 31, as previously described with reference to Fig. 4. The spacing of the rollers in each of the sets 29 and 41 is adjusted so that the pipe 12 will rotate freely upon but without binding between the rollers, and without the pipe having a tendency to ride over the rollers toward which the pipe 12 rotates.

In wrapping an individual pipe, the latter is rolled forward on rails 15 onto rollers 44, see Fig. 2, mounted on brackets 45 at the inner ends of rails 15 adjacent the pipe supporting roller assembly. The pipe may then be adjusted longitudinally on rollers 44 to bring the driven end 12a into proper position for application of the drive belt 46 to substantially the extreme end portion of the pipe. Carriage 26 then is adjusted longitudinally on beam 22 to position plate 37 adjacent the opposite end 12b of the pipe. The pipe then is placed on the rollers 29 and 41 with the ends of the pipe extending beyond the rollers as shown in the drawings. A suitable driving means next is applied to the driven end 12a of the pipe. The pipe rotating means preferably and ordinarily will comprise a suitable form of portable prime mover conventionally illustrated at 48, such as a portable motor, or a pulley applied to the rear wheel of a truck, drivingly connected to end 12a of the pipe by a belt 46 that can readily be slipped onto or off the pipe, thus avoiding any delay in connecting the pipe with its drive.

The invention obviates certain serious difficulties that are commonly encountered when the pipe is handled in the usual pipe wrapping machine. Frequently the interior or exterior end surfaces of the pipe are scarred or otherwise damaged so as to increase the difficulty of subsequent welding, due to the application of chucks or other pipe engaging means that both vertically support and rotate the pipe in the wrapping operation. One of the outstanding features of the invention is that it permits the pipe to be supported and rotated without necessitating the application thereto of any instrumentality that has a tendency to cut or mar the pipe. During wrapping the pipe is vertically supported on free running rollers, and the drive is applied independently in a manner that by no possibility can injure the pipe.

It is to be understood that the drawings are merely illustrative of the invention in one of its typical and preferred forms, and that various changes and modification may be made without departure from the invention in its intended spirit and scope.

I claim:

1. In apparatus for manually applying spiral wrapping to pipe, a pair of spaced supports adapted to vertically support the cylindric end portions of a pipe, one of said supports comprising a base member and a carriage mounted on said member and adjustable longitudinally of the pipe, means on said carriage engaging one end of the pipe to limit its longitudinal movement toward that end, and disconnectible means applied to the opposite end portion of the pipe beyond its support at that end for rotating the pipe.

2. In apparatus for manually applying spiral wrapping to pipe, a pair of spaced supports adapted to vertically support the cylindric end portions of a pipe, one of said supports comprising a base member and a carriage mounted on said member and adjustable longitudinally of the pipe, means for releasably holding said carriage in adjusted position, pipe supporting rollers mounted on said supports, means on said carriage engaging one end of the pipe to limit its longitudinal movement toward that end, and disconnectible means applied to the opposite end portion of the pipe beyond its support for rotating the pipe, the last mentioned means comprising a motor, and a belt driven by the motor and adapted to be placed about the cylindric surface of the pipe.

3. In apparatus for manually applying spiral wrapping to pipe, a pair of spaced supports each comprising a roller adapted to vertically support the cylindric end portions of a pipe, one of said supports being adjustable longitudinally of the pipe, means movable with said adjustable support and engaging the end of the pipe to limit its longitudinal movement in one direction, and disconnectible means applied to the opposite end of the pipe beyond the support at that end for rotating the pipe independently of its vertical supports.

4. In apparatus for manually applying spiral wrapping to pipe, a pair of spaced supports each comprising a pair of rollers adapted to vertically support the cylindric end portions of a pipe, a slidable mounting for one of said supports whereby it is adjustable longitudinally of the pipe at one end thereof, a member engaging the last mentioned end of the pipe to limit its longitudinal movement toward that end, means locking said adjustable support and member in adjusted positions, and disconnectible means applied to the opposite end portion of the pipe beyond its support at that end for rotating the pipe.

5. In apparatus for manually applying spiral wrapping to a pipe, a pair of pipe supporting rails spaced longitudinally of the pipe and extending transversely thereof, each rail having a substantially U-shaped portion intermediate its ends, a pair of spaced supports positioned to support the pipe directly above said U-shaped portions of the rails, each support comprising a pair of rollers adapted to support the cylindric end portions of a pipe, and disconnectible driving means applied to one end of the pipe beyond the rail and roller support at that end to rotate the pipe independently of the supporting rollers.

6. In apparatus for manually applying spiral wrapping to a pipe, a pair of pipe supporting rails spaced longitudinally of the pipe and extending transversely thereof, each rail having a substantially U-shaped portion intermediate its ends, a pair of spaced supports positioned to support the pipe directly above said U-shaped portions of the rails, each support comprising a pair of rollers adapted to support the cylindric end portions of a pipe, disconnectible driving means applied to one end of the pipe beyond the rail and roller support at that end to rotate the pipe independently of the supporting rollers, and a member adjustable longitudinally of the pipe and engaging the end thereof opposite said driving means to limit longitudinal movement of the pipe toward said member.

EDWARD W. SEYMOUR.